United States Patent
Kawabe et al.

(10) Patent No.: US 11,034,785 B2
(45) Date of Patent: Jun. 15, 2021

(54) COPOLYMER, AND SURFACE TREATMENT AGENT

(71) Applicants: DAIKIN INDUSTRIES, LTD., Osaka (JP); NISSIN CHEMICAL INDUSTRY CO., LTD, Echizen (JP)

(72) Inventors: Rumi Kawabe, Osaka (JP); Masaki Fukumori, Osaka (JP); Ryosuke Hara, Osaka (JP); Masahiro Miyahara, Osaka (JP); Shinichi Minami, Osaka (JP); Ikuo Yamamoto, Osaka (JP); Yasuhiro Mitta, Echizen (JP); Akifumi Mitake, Echizen (JP)

(73) Assignees: DAIKIN INDUSTRIES, LTD., Osaka (JP); NISSIN CHEMICAL INDUSTRY CO., LTD, Echizen (JP)

(*) Notice: Subject to any disclaimer, the term of this patent is extended or adjusted under 35 U.S.C. 154(b) by 261 days.

(21) Appl. No.: 16/084,681

(22) PCT Filed: Mar. 15, 2017

(86) PCT No.: PCT/JP2017/010524
§ 371 (c)(1),
(2) Date: Sep. 13, 2018

(87) PCT Pub. No.: WO2017/159755
PCT Pub. Date: Sep. 21, 2017

(65) Prior Publication Data
US 2020/0299441 A1  Sep. 24, 2020

(30) Foreign Application Priority Data
Mar. 16, 2016 (JP) .............................. JP2016-052763

(51) Int. Cl.
| | | |
|---|---|---|
| C08F 220/18 | (2006.01) | |
| C08F 2/38 | (2006.01) | |
| C08F 214/06 | (2006.01) | |
| C08F 214/08 | (2006.01) | |
| C08F 220/20 | (2006.01) | |
| C08F 236/20 | (2006.01) | |
| C08F 265/04 | (2006.01) | |
| C08L 33/08 | (2006.01) | |
| D06M 15/248 | (2006.01) | |
| D06M 15/263 | (2006.01) | |

(52) U.S. Cl.
CPC .......... *C08F 220/1818* (2020.02); *C08F 2/38* (2013.01); *C08F 214/06* (2013.01); *C08F 214/08* (2013.01); *C08F 220/1811* (2020.02); *C08F 220/1812* (2020.02); *C08F 220/20* (2013.01); *C08F 236/20* (2013.01); *C08F 265/04* (2013.01); *C08L 33/08* (2013.01); *D06M 15/248* (2013.01); *D06M 15/263* (2013.01); *C08L 2201/52* (2013.01)

(58) Field of Classification Search
None
See application file for complete search history.

(56) References Cited

U.S. PATENT DOCUMENTS

| | | | | |
|---|---|---|---|---|
| 9,416,486 | B2* | 8/2016 | Hara | D06M 15/256 |
| 10,597,474 | B2* | 3/2020 | Hosoda | D06M 15/263 |
| 2009/0030114 | A1* | 1/2009 | Wang | D06M 15/233 |
| | | | | 523/201 |
| 2010/0331479 | A1* | 12/2010 | Sugiyama | C08F 220/18 |
| | | | | 524/565 |
| 2012/0015575 | A1* | 1/2012 | Fuchs | C08F 220/18 |
| | | | | 442/79 |
| 2015/0191869 | A1 | 7/2015 | Hara et al. | |
| 2018/0215848 | A1* | 8/2018 | Hosoda | C08F 220/18 |

FOREIGN PATENT DOCUMENTS

| | | | | |
|---|---|---|---|---|
| EP | 2 762 504 A1 | 8/2014 | | |
| JP | 2006-328624 A | 12/2006 | | |
| JP | 2012-522062 A | 9/2012 | | |
| JP | 2013-082886 A | 5/2013 | | |
| JP | 2015-120894 A | 7/2015 | | |
| JP | 2015-120895 A | 7/2015 | | |
| JP | 2015120895 A * | 7/2015 | ......... | C08G 18/6279 |
| JP | 2017-025440 A | 2/2017 | | |

(Continued)

OTHER PUBLICATIONS

JP 2015-120895 A , Jul. 2015, Machine translation (Year: 2015).*
International Search Report for PCT/JP2017/010524 dated Jun. 6, 2017 [PCT/ISA/210].
International Preliminary Report on Patentability with translation of Written Opinion dated Sep. 27, 2018, in counterpart International Application No. PCT/JP2017/010524.
Extended European Search Report dated Oct. 9, 2019 issued by the European Patent Office in counterpart application No. 17766751.6.

*Primary Examiner* — Satya B Sastri
(74) *Attorney, Agent, or Firm* — Sughrue Mion, PLLC

(57) ABSTRACT

Provided is a surface treatment agent which does not use fluorine-containing monomers, particularly fluoroalkyl group-containing monomers. Additionally, provided is a copolymer which includes a first polymer formed from first monomers, and a second polymer formed from second monomers. The copolymer does not include fluorine. The second polymer is polymerized in the presence of the first polymer. The first monomers include a long-chain acrylate ester monomer (a) represented by the formula $CH_2=CA^{11}-C(=O)-O-A^{12}$ (in the formula, $A^{11}$ represents hydrogen, a monovalent organic group, or a halogen, and $A^{12}$ represents a $C_{18-30}$ straight-chain or branched hydrocarbon group). The first monomers and the second monomers both include a halogenated olefin monomer (b).

19 Claims, No Drawings

(56) References Cited

FOREIGN PATENT DOCUMENTS

| JP | 2017-066325 A | 4/2017 | | |
|---|---|---|---|---|
| WO | 2009/113589 A1 | 9/2009 | | |
| WO | 2014/007344 A1 | 1/2014 | | |
| WO | WO-2014007344 A1 * | 1/2014 | .............. | C08L 33/16 |

* cited by examiner

COPOLYMER, AND SURFACE TREATMENT AGENT

CROSS REFERENCE TO RELATED APPLICATIONS

This application is a National Stage of International Application No. PCT/JP2017/010524 filed Mar. 15, 2017, claiming priority based on Japanese Patent Application No. 2016-052763 filed Mar. 16, 2016.

TECHNICAL FIELD

The present invention relates to a copolymer and a surface treatment agent.

BACKGROUND ART

Conventionally, fluorine-containing water repellent and oil-repellent agents comprising fluorine compounds are known. The water- and oil-repellent agents show good water- and oil-repellency, when substrates such as textiles are treated with the water- and oil-repellent agents.

The results of the latest researches [a report of the Environmental Protection Agency (EPA), "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)] have taught that PFOA (perfluorooctanoic acid), one of long-chain fluoroalkyl compounds, is proved to have a danger to burden the environment. Under such a situation, EPA announced on Apr. 14, 2003 that the scientific investigation on PFOA should be more intensively executed.

On the other hand, Federal Register (FR Vol. 68, No. 73/Apr. 16, 2003 [FRL-2303-8]) (http://www.epa.gov/opptintr/pfoa/pfoafr.pdf), EPA Environmental News for release Monday Apr. 14, 2003 "EPA INTENSIFIES SCIENTIFIC INVESTIGATION OF A CHEMICAL PROCESSING AID" (http://www.epa.gov/opptintr/pfoa/pfoaprs.pdf), and EPA OPPT FACT SHEET Apr. 14, 2003 (http://www.epa.gov/opptintr/pfoa/pfoafacts.pdf) announced that a "telomer" may possibly metabolize or decompose to PFOA (herein, the telomer means a long-chain fluoroalkyl group). It is also announced that the "telomer" is used in a large number of commercial products including fire fighting foams, care products and cleaning products as well as soil, stain and grease resistant coating on carpets, textiles, paper, and leather having the imparted water- and oil-repellency and soil resistance. There is the concern that the fluorine-containing compound is accumulated in environment.

In order to reveal water- and oil-repellency, after the fluorine-containing water- and oil-repellent agent is adhered to substrates such as textiles, the substrate must be heat-treated at a high temperature (for example, 100° C. or more). High energy is needed for the heat treatment at a high temperature.

JP 2006-328624A discloses a water repellent agent comprising a fluorine-free polymer which comprises an acrylate ester have at least 12 carbon atoms in an ester portion as a monomeric unit, wherein a constitution rate of the acrylate ester is 80 to 100 mass % based on the whole quantity of the monomeric units constituting the fluorine-free polymer.

However, this water repellent agent has poor water- and oil-repellency.

PRIOR ARTS DOCUMENTS

Patent Documents

Patent Document 1: JP 2006-328624A

SUMMARY OF INVENTION

Problems to be Solved by the Invention

An object of the present invention is to provide a surface treatment agent which gives excellent water- and oil-repellency and which does not comprise a fluorine-containing monomer, particularly a fluoroalkyl group-containing monomer.

Means for Solving the Problems

The present invention provides a copolymer comprising:
a first polymer formed from a first monomer and a second polymer formed from a second monomer,
wherein the copolymer is free from a fluorine atom,
the second polymer is polymerized in the presence of the first polymer,
the first monomer comprises:
(a) a long-chain acrylate ester monomer represented by the formula:

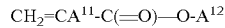
$$CH_2=CA^{11}-C(=O)-O-A^{12}$$

wherein $A^{11}$ is a hydrogen atom, a monovalent organic group or a halogen atom, and
$A^{12}$ is a linear or branched hydrocarbon group having 18-30 carbon atoms,
both of the first monomer and the second monomer comprise (b) a halogenated olefin monomer.

In addition, the present invention provides a copolymer comprising:
a first polymer formed from a first monomer and a second polymer formed from a second monomer,
wherein the copolymer is free from a fluorine atom,
the second polymer is a polymer in the presence of the first polymer,
the first monomer comprises:
(a) a long-chain acrylate ester monomer represented by the formula:

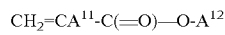
$$CH_2=CA^{11}-C(=O)-O-A^{12}$$

wherein $A^{11}$ is a hydrogen atom, a monovalent organic group or a halogen atom, and
$A^{12}$ is a linear or branched hydrocarbon group having 18-30 carbon atoms,
both of the first monomer and the second monomer comprise (b) a halogenated olefin monomer.

Further, the present invention provides a method of producing said copolymer or a method of producing a surface treatment agent comprising said copolymer, which comprises the steps of:
(I) polymerizing a first monomer to obtain a first polymer, and
(II) polymerizing a second monomer in the presence of the first polymer to obtain a second polymer. Preferably, in the method of producing the surface treatment agent, the second polymer is obtained in the step (II) (preferably both of the steps (I) and (II)) by polymerizing the second monomer in the presence of the first polymer, the surface-active agent and the liquid medium.

Effects of the Invention

Since the treatment agent of the present invention does not comprise a fluoroalkyl group-containing monomer, the treatment agent does not have a concern of accumulation of a fluorine-containing compound in an environment. The treatment agent of the present invention gives excellent water- and oil-repellency to the substrate. In addition, water- and oil-repellency is achieved by a low-temperature treatment without necessary of the heat treatment at a high temperature.

The treatment agent of the present invention has good stability (stability of an emulsion). A reaction scale is not generated in a polymerization reaction for producing the treatment agent of the present invention.

In a processing treatment of the treatment agent, the treatment agent is excellent in prevention of polymer adhesion to a roll (for example, a mangle roll and a calendar roll). Particularly, in the calendar roll which passes after heating a substrate with applying the treatment agent, the treatment agent is excellent in prevention of polymer adhesion.

The surface of the substrate to which the agent is applied can be easily peeled off from various other materials, since peel strength with the various other materials is low.

MODES FOR CARRYING OUT THE INVENTION

The copolymer of the present invention is a copolymer free from a fluoroalkyl group. Preferably, the copolymer of the present invention is a fluorine-free polymer which does not contain a fluorine atom.

although the first polymer and the second polymer may not be chemically bonded together, these may be chemically bonded together.

In the present invention, the long-chain acrylate ester monomer (a) and the halogenated olefin monomer (b) are used as the monomer. Optionally, at least one selected from (c) a short-chain acrylate ester monomer, (d) a cyclic hydrocarbon group-containing acrylate ester monomer, and (e) a fluorine-free crosslinkable monomer.

At least one of the first monomer and the second monomer comprises the long-chain acrylate ester monomer. The first monomer may comprise the long-chain acrylate ester monomer and the second monomer may not comprise the long-chain acrylate ester monomer.

Both of the first monomer and the second monomer comprises the halogenated olefin monomer (b).

The first monomer may comprise the short-chain acrylate ester monomer. Preferably, the second monomer does not comprise the short-chain acrylate ester monomer. When the second monomer does not comprise the short-chain acrylate ester monomer, in the processing treatment of the treatment agent comprising the copolymer, the performance of preventing a roll dirt caused by a polymer adhesion to a roll is excellent.

Preferable types of monomers for the first monomer and the second monomer have the following embodiments.

TABLE 1

| Embodiment | First monomer | Second monomer |
| --- | --- | --- |
| 1 | Long-chain acrylate ester monomer, and halogenated olefin monomer | Halogenated olefin monomer |
| 2 | Long-chain acrylate ester monomer, halogenated olefin monomer, and short-chain acrylate ester monomer | Halogenated olefin monomer |
| 3 | Long-chain acrylate ester monomer, and halogenated olefin monomer | Halogenated olefin monomer, and cyclic hydrocarbon group-containing acrylate ester monomer |
| 4 | Long-chain acrylate ester monomer, and halogenated olefin monomer | Halogenated olefin monomer, and fluorine-free crosslikable monomer |
| 5 | Long-chain acrylate ester monomer, and halogenated olefin monomer | Halogenated olefin monomer, cyclic hydrocarbon group-containing acrylate ester monomer, and fluorine-free crosslikable monomer |
| 6 | Long-chain acrylate ester monomer, halogenated olefin monomer, and short-chain acrylate ester monomer | Halogenated olefin monomer, and fluorine-free crosslikable monomer |
| 7 | Long-chain acrylate ester monomer, halogenated olefin monomer, short-chain acrylate ester monomer, and fluorine-free crosslikable monomer | Halogenated olefin monomer |

The copolymer of the present invention has a repeating unit derived from the first monomer, and a repeating unit derived from a second monomer. The first polymer and the second polymer may be copolymerized. That is, the first polymer may be chemically bonded to the second polymer. Alternatively, the first polymer and the second polymer may not form chemical bonds, but may be physically bonded together. Examples of the physical bond include a core/shell structure in which the first polymer forms a core and the second polymer forms a shell. In the core/shell structure, In the above-mentioned Table, the long-chain acrylate ester monomer may exist also in the second monomer in addition to the first monomer, but preferably, the long-chain acrylate ester monomer does not exist in the second monomer. Preferably, the short-chain acrylate ester monomer does not exist in the second monomer. Although each of the cyclic hydrocarbon group containing acrylate ester monomer and the fluorine-free crosslinkable monomer may exist in both of the first monomer and the second monomer, these preferably exist in one of the first monomer or the second monomer, particularly in the first monomer.

Although the copolymer may contain a fluorine atom, the copolymer is preferably free from a fluorine atom. That is, the copolymer is preferably a fluorine-free polymer.

(a) Long-Chain Acrylate Ester Monomer

The copolymer has a repeating unit derived from the long-chain acrylate ester monomer.

The long-chain acrylate ester monomer is represented by the formula:

$$CH_2=CA^{11}\text{-}C(=O)\text{—}O\text{-}A^{12}$$

$A^{11}$ is a hydrogen atom, a monovalent organic group or a halogen atom, and
$A^{12}$ is a linear or branched hydrocarbon group having 18-30 carbon atoms.

An example of a preferable long-chain acrylate ester monomer is a compound represented by the formula:

$$CH_2=CA^{11}\text{-}C(=O)\text{—}O\text{-}A^{12}$$

wherein $A^{11}$ is a hydrogen atom, a methyl group, halogen, a linear or branched alkyl group having 2 to 21 carbon atoms, a $CFX^1X^2$ group (where each of $X^1$ and $X^2$ is a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group or a substituted or unsubstituted phenyl group, and
$A^{12}$ is a linear or branched hydrocarbon group having 18-30 carbon atoms.

The long-chain acrylate ester monomer does not contain a fluoroalkyl group. Although the long-chain acrylate ester monomer may contain a fluorine atom, the long-chain acrylate ester monomer is preferably free from a fluorine atom.

Examples of $A^{11}$ are hydrogen, a methyl group, Cl, Br, I, F, CN, and $CF_3$. $A^{11}$ is preferably a methyl group or a chlorine atom.

$A^{12}$ is a linear or branched hydrocarbon group. Particularly, the linear or branched hydrocarbon group may be a linear hydrocarbon group. The number of carbon atoms in the linear or branched hydrocarbon group is 18-30. The linear or branched hydrocarbon group preferably has 18-28 carbon atoms, particularly 18 or 22 carbon atoms. Generally, the linear or branched hydrocarbon group is a saturated aliphatic hydrocarbon group, particularly an alkyl group.

Preferable examples of the long-chain acrylate ester monomer are stearyl (meth)acrylate, behenyl (meth)acrylate, stearyl alpha-chloroacrylate, behenyl alpha-chloroacrylate, stearyl alpha-fluoroacrylate and behenyl alpha-fluoroacrylate.

The presence of the long-chain acrylate ester monomer increases water repellency and oil repellency imparted by the polymer.

(b) Halogenated Olefin Monomer

The copolymer has a repeating unit derived from the halogenated olefin monomer.

Preferably, the halogenated olefin monomer is an olefin having 2-20 carbon atoms and substituted by 1-10 chlorine atoms, bromine atoms or iodine atoms. Preferably, the halogenated olefin monomer is a chlorinated olefin having 2-20 carbon atoms, particularly an olefin having 2-5 carbon atoms carbon and having 1-5 chlorine atoms. Preferable examples of the halogenated olefin monomer are a vinyl halide such as vinyl chloride, vinyl bromide and vinyl iodide, and a vinylidene halide such as vinylidene chloride, vinylidene bromide and vinylidene iodide. Vinyl chloride and vinylidene chloride are preferable, since water- and oil-repellency (particularly, durability of water- and oil-repellency) is high.

The presence of the halogenated olefin imparts high washing durability given by the polymer.

(b) Short-Chain Acrylate Ester Monomer

The copolymer may have a repeating unit derived from the short-chain acrylate ester monomer.

Preferably, the short-chain acrylate ester monomer is a compound represented by the formula:

$$CH_2=CA^{21}\text{-}C(=O)\text{—}O\text{-}A^{22}$$

$A^{21}$ is a hydrogen atom, a monovalent organic group or a halogen atom, and
$A^{22}$ is a linear or branched aliphatic hydrocarbon group having less than 18 carbon atoms.

An alpha position of the short-chain acrylate ester monomer may be other than hydrogen or methyl. Thus, the short-chain acrylate ester monomer may be a compound represented by the formula:

$$CH_2=CA^{21}\text{-}C(=O)\text{—}O\text{-}A^{22}$$

$A^{21}$ is a hydrogen atom, a methyl group, halogen, a linear or branched alkyl group having 2 to 21 carbon atoms, a $CFX^1X^2$ group (where each of $X^1$ and $X^2$ is a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group or a substituted or unsubstituted phenyl group, and
$A^{22}$ is a linear or branched aliphatic hydrocarbon group having less than 18 carbon atoms.

The short-chain acrylate ester monomer does not have a fluoroalkyl group. Although the short-chain acrylate ester monomer may contain a fluorine atom, the short-chain acrylate ester monomer is preferably free from a fluorine atom.

Examples of $A^{21}$ are a hydrogen atom, a methyl group, Cl, Br, I, F, CN, and $CF_3$. $A^{21}$ is preferably a methyl group or a chlorine atom.

$A^{22}$ is a linear or branched hydrocarbon group. Particularly, the linear or branched hydrocarbon group may be a linear hydrocarbon group. The number of carbon atoms in the linear or branched hydrocarbon group is 1-17. The linear or branched hydrocarbon group preferably has 1-14 carbon atoms. Generally, the linear or branched hydrocarbon group is a saturated aliphatic hydrocarbon group, particularly an alkyl group.

Particularly preferable examples of the short-chain acrylate ester monomer are lauryl (meth)acrylate, lauryl alpha-chloroacrylate, lauryl alpha-fluoroacrylate, cetyl (meth)acrylate, cetyl alpha-chloroacrylate and cetyl alpha-fluoroacrylate.

The presence of the short-chain acrylate ester monomer increases water repellency and feeling imparted by the polymer.

(d) Cyclic Hydrocarbon Group-Containing Acrylate Ester Monomer

The copolymer may have a repeating unit derived from the cyclic hydrocarbon group-containing acrylate ester monomer.

Preferably, the cyclic hydrocarbon group-containing acrylate ester monomer is represented by the formula:

$$CH_2=CA^{31}\text{-}C(=O)\text{—}O\text{-}A^{32}$$

wherein $A^{31}$ is a hydrogen atom, a methyl group, halogen, a linear or branched alkyl group having 2 to 21 carbon atoms, a $CFX^1X^2$ group (where each of $X^1$ and $X^2$ is a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group or a substituted or unsubstituted phenyl group, and $A^{32}$ is a cyclic hydrocarbon group having 4-30 carbon atoms.

Preferably, the cyclic hydrocarbon group-containing acrylate ester monomer is a monomer having a high (for example, at least 50° C., particularly at least 80° C.) glass transition point of a homopolymer thereof.

The cyclic hydrocarbon group-containing acrylate ester monomer does not contain a fluoroalkyl group. Although the cyclic hydrocarbon group-containing acrylate ester monomer may contain a fluorine atom, the cyclic hydrocarbon group-containing acrylate ester monomer is preferably free from a fluorine atom.

Examples of $A^{31}$ are a hydrogen atom, a methyl group, Cl, Br, I, F, CN, and $CF_3$. $A^{31}$ is preferably a methyl group or a chlorine atom.

$A^{32}$ is a cyclic hydrocarbon group-containing which may have a chain group (for example, linear or branched hydrocarbon group). Examples of the cyclic hydrocarbon group include a saturated or unsaturated, monocyclic group, polycyclic group or bridged ring group. The cyclic hydrocarbon group is preferably a saturated group. The cyclic hydrocarbon group preferably has 4 to 30, preferably 4 to 20 carbon atoms. Examples of the cyclic hydrocarbon group include a cycloaliphatic group having 4 to 30, preferably 4 to 20 carbon atoms, particularly 5 to 12 carbon atoms, an aromatic group having 6 to 30, preferably 6 to 20 carbon atoms, and an araliphatic group having 7 to 30, preferably 7 to 20 carbon atoms.

Examples of the cyclic hydrocarbon group include a saturated or unsaturated, monocyclic group, polycyclic group or bridged ring group. The cyclic hydrocarbon group is preferably a saturated group.

The number of carbon atoms in the cyclic hydrocarbon group is particularly preferably at most 15, for example, at most 10.

Specific examples of the cyclic hydrocarbon group include a cyclohexyl group, a t-butylcyclohexyl group, an isobornyl group, a dicyclopentanyl group, a dicyclopentenyl group and an adamantyl group. The (meth)acrylate group is preferably an acrylate group or a methacrylate group, more preferably a methacrylate group.

Specific examples of the cyclic hydrocarbon group-containing acrylate ester monomer include cyclohexyl (meth)acrylate, t-butylcyclohexyl (meth)acrylate, benzyl (meth)acrylate, isobornyl (meth)acrylate, dicyclopentanyl (meth)acrylate, dicyclopentenyl (meth)acrylate, dicyclopentanyloxyethyl (meth)acrylate, tricyclopentanyl (meth)acrylate, adamantyl (meth)acrylate, 2-methyl-2-adamantyl (meth)acrylate and 2-ethyl-2-adamantyl (meth)acrylate.

The presence of the cyclic hydrocarbon group-containing acrylate ester monomer increases water repellency and oil repellency imparted by the polymer.

(e) Fluorine-Free Crosslinkable Monomer

The copolymer may have a repeating unit derived from the fluorine-free crosslinkable monomer.

The fluorine-free crosslinkable monomer is a monomer free from a fluorine atom. The fluorine-free crosslinkable monomer may be a fluorine-free compound having at least two reactive groups and/or olefinic carbon-carbon double bonds (preferably a (meth)acrylate group). The fluorine-free crosslinkable monomer may be a compound which has at least two olefinic carbon-carbon double bonds or a compound which has at least one olefinic carbon-carbon double bond (preferably a (meth)acrylate group) and at least one reactive group. Examples of the reactive group include a hydroxyl group, an epoxy group, a chloromethyl group, a blocked isocyanate group, an amino group and a carboxyl group.

The fluorine-free crosslinkable monomer may be a mono(meth)acrylate, di(meth)acrylate, or mono(meth)acrylamide having a reactive group. Alternatively, the fluorine-free crosslinkable monomer may be di(meth)acrylate.

One example of the fluorine-free crosslinkable monomer is a vinyl monomer having a hydroxyl group.

Examples of the crosslinkable monomer include, but are not limited to, diacetone(meth)acrylamide, N-methylol (meth)acrylamide, hydroxymethyl (meth)acrylate, hydroxyethyl (meth)acrylate, 2,3-dihydroxypropyl (meth)acrylate, 3-chloro-2-hydroxypropyl (meth)acrylate, 2-acetoacetoxyethyl (meth)acrylate, butadiene, isoprene, chloroprene, monochlorovinyl acetate, vinyl methacrylate, glycidyl (meth)acrylate, 1,4-butanediol di(meth)acrylate, 1,6-hexanediol di(meth)acrylate, 1,9-nonanediol di(meth)acrylate, and neopentylglycol di(meth)acrylate.

The presence of the fluorine-free crosslinkable monomer imparts high washing durability given by the polymer.

(f) Other Monomer

Another monomer (f) other than the monomers (a)-(e), for example, a fluorine-free non-crosslinkable monomer, may be used.

Preferable examples of the other monomer are, for example, ethylene, vinyl acetate, acrylonitrile, styrene, polyethyleneglycol (meth)acrylate, polypropyleneglycol (meth)acrylate, methoxypolyethyleneglycol (meth)acrylate, methoxypolypropyleneglycol (meth)acrylate and vinyl alkyl ether. The other monomer is not limited to these examples.

The term "(meth)acrylate" as used herein means an acrylate or methacrylate, and the term "(meth)acrylamide" as used herein means an acrylamide or methacrylamide.

Preferably, each of the (meth)acrylate monomers is an acrylate ester, since the water- and oil-repellency is high.

Each of the monomers (a)-(f) may be used alone or in a combination of at least two.

The amount of the monomer (a) is at least 40% by weight, preferably at least 50% by weight, based on the copolymer. The amount of the monomer (a) is at most 95% by weight, for example, at most 80% by weight, at most 75% by weight, or at most 70% by weight, based on the copolymer.

In the copolymer, based on 100 parts by weight of monomer (a), the amount of the repeating unit (b) is 1 to 150 parts by weight, preferably 1 to 30 parts by weight, the amount of the repeating unit (c) is 0 to 100 parts by weight, preferably 1 to 30 parts by weight, the amount of the repeating unit (d) is 0 to 100 parts by weight, preferably 1 to 30 parts by weight, the amount of the repeating unit (e) is 0 to 50 parts by weight, preferably 1 to 10 parts by weight, and the amount of the repeating unit (f) is 0 to 100 parts by weight, preferably 1 to 30 parts by weight.

As to the amount of the halogenated olefin monomer, a weight ratio of the halogenated olefin monomer in the first monomer to the halogenated olefin monomer in the second monomer may be 3-97:97-3, for example, 5-50:95-50, especially 8-40:92-60. Alternatively, a ratio of the halogenated olefin monomer in the first monomer, based on the sum total of the halogenated olefin monomer in the first monomer and the second monomer, is preferably 0.1 to 49% by weight, more preferably 5 to 40% by weight, particularly preferably 8 to 35% by weight, especially preferably 15 to 30% by weight.

When the same kind of monomer (for example, fluorine-free crosslinkable monomer) other than the halogenated olefin monomer is contained in both of the first monomer and the second monomer, a weight ratio of the monomer of the same kind in the first monomer to the monomer of the same kind in the second monomer may be 3-97:97-3, for example, 5-95:95-5, particularly 10-90:90-10.

Generally, a number-average molecular weight (Mn) of the copolymer may be 1,000-1,000,000, for example, 5,000-500,000, particularly 3,000-200,000. Generally, the number-average molecular weight (Mn) of the copolymer is measured by GPC (gel permeation chromatography).

In the present invention, the monomer is copolymerized to obtain the treatment composition wherein the copolymer is dispersed or dissolved in the medium.

The monomer used in the present invention may be as follows:
Monomers (a)+(b),
Monomers (a)+(b)+(c),
Monomers (a)+(b)+(d), or
Monomers (a)+(b)+(c)+(d).

In addition to the above, one or both of the monomer (e) and the monomer (f) may be used.

(2) Surface Active Agent

In the treatment agent of the present invention, the surface active agent comprises a nonionic surface active agent. Preferably, the surface active agent further comprises at least one surface active agent selected from a cationic surface active agent, an anionic surface active agent, and an amphoteric surface active agent. Preferably, a combination of the nonionic surface active agent and the cationic surface active agent is used. Preferably, the surface active agent does not comprise the anionic surface active agent.

(2-1) Nonionic Surface Active Agent

Examples of the nonionic surface active agent include an ether, an ester, an ester ether, an alkanolamide, a polyhydric alcohol and an amine oxide.

An example of the ether is a compound having an oxyalkylene group (preferably a polyoxyethylene group).

An example of ester is an ester from an alcohol and a fatty acid. Examples of the alcohol is a monohydric to hexahydric (particularly dihydric to pentahydric) alcohol (for example, an aliphatic alcohol) having 1 to 50 carbon atoms (particularly 3 to 30 carbon atoms). An example of the fatty acid is a saturated or unsaturated fatty acid having 2 to 50 carbon atoms, particularly 5 to 30 carbon atoms.

An example of ester ether is a compound obtained by adding an alkylene oxide (particularly ethylene oxide) to an ester from an alcohol and a fatty acid. Examples of the alcohol is a monohydric to hexahydric (particularly dihydric to pentahydric) alcohol (for example, an aliphatic alcohol) having 1 to 50 carbon atoms (particularly 3 to 30 carbon atoms). An example of the fatty acid is a saturated or unsaturated fatty acid having 2 to 50 carbon atoms, particularly 5 to 30 carbon atoms.

An example of the alkanolamide is a compound formed from an fatty acid and an alkanolamine. The alkanolamide may be a monoalkanol amide or a dialkanol amide. An example of the fatty acid is a saturated or unsaturated fatty acid having 2 to 50 carbon atoms, particularly 5 to 30 carbon atoms. The alkanolamine may be an alkanol having 2-50, particularly 5-30 carbon atoms which has 1-3 amino groups and 1-5 hydroxyl groups.

The polyhydric alcohol may be a dihydric to pentahydric alcohol having 15-30 carbon atoms.

The amine oxide may be an oxide (for example, having 5-50 carbon atoms) of an amine (a secondary amine or preferably a tertiary amine)

Preferably, the nonionic surface active agent is a nonionic surface active agent having an oxyalkylene group (preferably polyoxyethylene group). Preferably, the carbon number of an alkylene group in the oxyalkylene group is from 2 to 10 carbon atoms. Preferably, the number of the oxyalkylene groups in a molecule of the nonionic surface active agent is generally from 2 to 100.

Preferably, the nonionic surface active agent is an non-ionic surface active agent having an oxyalkylene group which is selected from the group consisting of an ether, an ester, an ester ether, an alkanolamide, a polyhydric alcohol and an amine oxide.

The nonionic surface active agent may include an alkylene oxide adduct of a linear and/or branched aliphatic (saturated and/or unsaturated) group, a polyalkylene glycol ester of linear and/or branched (saturated and/or unsaturated) fatty acid, a polyoxyethylene (POE)/polyoxypropylene (POP) copolymer (a random copolymer or a block copolymer), and an alkylene oxide adduct of acetylene glycol. Among them, preferable is one wherein a structure of an alkylene oxide addition portion and a polyalkylene glycol portion are polyoxyethylene (POE), polyoxypropylene (POP), or a POE/POP copolymer (which may be a random copolymer or may be a block copolymer).

Preferably, the nonionic surface active agent has a structure which does not have an aromatic group in view of environmental problems (such as biodegradability and environmental hormone).

The nonionic surface active agent may be a compound represented by the formula:

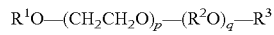

$R^1$ is an alkyl group having 1-22 carbon atoms, or an alkenyl group or an acyl group having 2-22 carbon atoms,
$R^2$ each is independently, the same or different, an alkylene group having at least 3 (for example, 3-10) carbon atoms,
$R^3$ is a hydrogen atom, an alkyl group having 1-22 carbon atoms, or an alkenyl group having 2-22 carbon atoms,
p is a number of at least 2, and
q is a number of 0 or at least 1.

The carbon number of the $R^1$ is preferably from 8 to 20, particularly from 10 to 18. Preferable examples of $R^1$ include a lauryl group, a tridecyl group and an oleyl group.

Examples of $R^2$ are a propylene group and a butylene group.

In the nonionic surface active agent, p may be a number of at least 3 (for example, 5-200). q may be at least 2 (for example, from 5 to 200). That is, $-(R^2O)_q-$ may form a polyoxyalkylene chain.

The nonionic surface active agent may be a polyoxyethylene alkylene alkyl ether containing a hydrophilic polyoxyethylene chain in center, and a hydrophobic oxyalkylene chain (particularly a polyoxyalkylene chain). The hydrophobic oxyalkylene chain includes an oxypropylene chain, an oxybutylene chain and a styrene chain. Particularly, the oxypropylene chain is preferable.

Preferable nonionic surface active agent is a surface active agent represented by the formula:

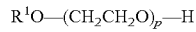

wherein $R^1$ and p are the same as defined above.

Specific examples of the nonionic surface active agent include:

$C_{10}H_{21}O$—$(CH_2CH_2O)_p$—$(C_3F_{16}O)_q$—H
$C_{12}H_{25}O$—$(CH_2C_{1-12}O)_p$ $(C_3H_6O)_q$—H
$C_{16}H_{31}O$—$(CH_2CH_2O)_p$—$(C_3H_6O)_q$—H
$C_{16}H_{33}O$—$(CH_2CH_2O)_p$—$(C_3H_6O)_q$—H
$C_{18}H_{35}O$—$(CH_2CH_2O)_p$—$(C_3H_6O)_q$—H
$C_{18}H_{37}O$—$(CH_2CH_2O)_p$—$(C_3H_6O)_q$—H
$C_{12}H_{25}O$—$(CH_2CH_2O)_p$—$(C_3H_6O)_q$—$C_{12}H_{25}$
$C_{16}H_{31}O$—$(CH_2CH_2O)_p$—$(C_3H_6O)_q$—$C_{16}H_{31}$
$C_{16}H_{33}O$—$(CH_2CH_2O)_p$—$(C_3H_6O)_q$—$C_{12}H_{25}$
iso-$C_{13}H_{27}O$—$(CH_2CH_2O)_p$—$(C_3H_6O)_q$—H
$C_{10}H_{21}COO$—$(CH_2CH_2O)_p$—$(C_3H_6O)_q$—H
$C_{16}H_{33}COO$—$(CH_2CH_2O)_p$—$(C_3H_6O)_q$—$C_{12}H_{25}$ wherein p and q are the same as defined above.

Examples of the nonionic surface active agent include a condensation product of ethylene oxide with hexylphenol, isooctatylphenol, hexadecanol, oleic acid, alkane ($C_{12}$-$C_{16}$) thiol, sorbitan mono-fatty acid ($C_7$-$C_{19}$) or an alkyl ($C_{12}$-$C_{18}$) amine.

A ratio of the polyoxyethylene block may be 5 to 80% by weight, for example, 30 to 75% by weight, particularly 40 to 70% by weight, based on the molecular weight of the nonionic surface active agent (copolymer).

Generally, an average molecular weight of the nonionic surface active agent is 300-5,000, for example, 500-3,000.

The nonionic surface active agent may be used alone or in combination of at least two.

Preferably, the nonionic surface active agent is a combination of at least two. In the combination of at least two, at least one of the nonionic surface active agents may be a compound represented by $R^1O$—$(CH_2CH_2O)_p$—$(R^2O)_q$—$R^3$ [particularly $R^1O$—$(CH_2CH_2O)_p$—H] wherein $R^1$ group (and/or $R^3$ group) is a branched alkyl group (for example, an isotridecyl group). The amount of the nonionic surface active agent wherein the $R^1$ group is the branched alkyl group may be 5-100 parts by weight, for example, 8-50 parts by weight, particularly 10-40 parts by weight, based on 100 parts by weight of total of the nonionic surface active agent. In the combination of at least two, the rest of the nonionic surface active agents may be a compound represented by $R^1O$—$(CH_2CH_2O)_p$—$(R^2O)_q$—$R^3$ [particularly $R^1O$—$(CH_2CH_2O)_p$—H] wherein $R^1$ group (and/or $R^3$ group) is a (saturated and/or unsaturated) linear alkyl group (for example, a lauryl group (n-lauryl group)).

Examples of the nonionic surface active agent include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerine fatty acid ester, polyoxyethylene glycerine fatty acid ester, polyglyceryl fatty acid ester, sucrose fatty acid ester, polyoxyethylene alkylamine, polyoxyethylene fatty acid amide, fatty acid alkylol amide, alkyl alkanolamide, acetylene glycol, an oxyethylene adduct of acetylene glycol, and a polyethylene glycol/polypropylene glycol block copolymer.

The nonionic surface active agent is preferably acetylene alcohol (particularly acetylene glycol) or an oxyethylene adduct of acetylene alcohol (particularly acetylene glycol), since a dynamic surface tension of the aqueous emulsion is low (that is, an aqueous emulsion easily permeates into a substrate).

A preferable nonionic surface active agent is an alcohol having an unsaturated triple bond, or an alkylene oxide adduct of this alcohol (both of this alcohol and this alkylene oxide adduct are referred to as "acetylene alcohol compound".). A particularly preferable nonionic surface active agent is an alkylene oxide adduct of a monool or polyol having an unsaturated triple bond.

The acetylene alcohol compound is a compound having at least one triple bond and at least one hydroxyl group. The acetylene alcohol compound may be a compound having a polyoxyalkylene portion. Examples of a polyoxyalkylene portion include a random addition structure of polyoxyethylene, polyoxypropylene, and polyoxyethylene and polyoxypropylene, and a block addition structure of polyoxyethylene and polyoxypropylene.

The acetylene alcohol compound may be a compound represented by the formula:

$$HO—CR^{11}R^{12}—C{\equiv}C—CR^{13}R^{14}—OH, \text{ or}$$

$$HO—CR^{15}R^{16}—C{\equiv}CH$$

wherein each of $R^{11}$, $R^{12}$, $R^{13}$, $R^{14}$, $R^{15}$ and $R^{16}$ each is, the same or different, a hydrogen atom, or an alkyl group having 1-30 carbon atoms. The acetylene alcohol compound may be an alkylene oxide adduct of the compound represented by this chemical formula. Preferably, the alkyl group is a linear or branched alkyl group of carbon numbers 1-12, particularly a linear or branched alkyl group of carbon numbers 6-12. Examples of the alkyl group include a methyl group, an ethyl group, a propyl group, a butyl group and an isobutyl group. Preferably, the alkylene oxide is an alkylene oxide having 1-20 (particularly 2-5) carbon atoms, such as ethylene oxide and propylene oxide. Preferably, the number of addition of alkylene oxide is 1-50.

Examples of the acetylene alcohol compound include acetylenediol, propargyl alcohol, 2,5-dimethyl-3-hexyne-2, 5-diol, 3,6-dimethyl-4-octyne-3,6-diol, 2,4,7,9-tetramethyl-5-decyne-4,7-diol, 3,5-dimethyl-1-hexyn-3-ol, 3-methyl-1-butyn-3-ol, 3-methyl-1-pentyn-3-ol, 3-hexyne-2,5-diol and 2-butyne-1,4-diol. Polyethoxylate and the ethyleneoxide adduct of these specified compounds are also mentioned.

The nonionic surface active agent may not have a triple bond or may have a triple bond. The nonionic surface active agent may be either a nonionic surface active agent free from a triple bond, or a nonionic surface active agent having a triple bond. However, the nonionic surface active agent may be a combination of the nonionic surface active agent free from a triple bond, and the nonionic surface active agent having a triple bond. In the combination of the nonionic surface active agent free from a triple bond, and the nonionic surface active agent having a triple bond, a weight ratios of the nonionic surface active agent free from a triple bond (for example, a nonionic surface active agent having an oxyalkylene group) to the nonionic surface active agent having a triple bond (for example, an acetylene alcohol compound) may be 10:90-90:10, for example, 20:80-80:20.

(2-2) Cationic Surface Active Agent

Preferably, the cationic surface active agent is a compound free from an amide group.

Examples of the cationic surface active agent include an amine, an amine salt, a quaternary ammonium salt, an imidazoline and an imidazolinium salt.

Preferably, the cationic surface active agents are an amine salt, a quaternary ammonium salt and an oxyethylene addition-type ammonium salt. Specific examples of the cationic surface active agent, which are not limited, include an amine salt-type surface active agents, such as an alkylamine salt, an amino alcohol fatty acid derivative, a polyamine fatty acid derivative and imidazoline; and quaternary ammonium salt-type surface active agents, such as an alkyl trimethyl ammonium salt, a dialkyl dimethyl ammonium salt, an alkyl dimethyl benzyl ammonium salt, a pyridinium salt, an alkyl isoquinolinium salt and a benzethonium chloride.

An example of the cationic surface active agent is a compound represented by

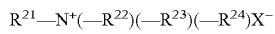

wherein each of $R^{21}$, $R^{22}$, $R^{23}$ and $R^{24}$ is independently, the same or different, a hydrogen atom, or a hydrocarbon group having 1-50 carbon atoms, and X is an anionic group. The hydrocarbon group may have an oxygen atom, for example, may be an oxyalkylene group (the carbon number of the alkylene is, for example, from 2 to 5.) such as a polyoxyalkylene group. Preferably, $R^{21}$, $R^{22}$, $R^{23}$ and $R^{24}$ each is a hydrocarbon group (for example, an aliphatic hydrocarbon, an aromatic hydrocarbon, or an araliphatic hydrocarbon) having 1-30 carbon atoms.

Specific examples of $R^{21}$, $R^{22}$, $R^{23}$ and $R^{24}$ are an alkyl group (for example, a methyl group, a butyl group, a stearyl group and a palmityl group), an aryl group (for example, a phenyl group), and an aralkyl group (for example, a benzyl group (a phenylmethyl group) and a phenethyl group (a phenylethyl group)).

Examples of X are a halogen (for example, chlorine) and an acid (for example, an inorganic acid such as hydrochloric acid, and an organic acid (particularly fatty acid) such as acetic acid).

Particularly preferably, the cationic surface active agent is a monoalkyltrimethyl ammonium salt (wherein the alkyl has 4-30 carbon atoms).

Preferably, the cationic surface active agent is an ammonium salt, particularly a quaternary ammonium salt. The cationic surface active agent may be an ammonium salt represented by the formula:

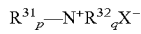

each of $R^{31}$ is independently, the same or different, a linear and/or branched aliphatic (saturated and/or unsaturated) group having at least 12 carbon atoms (for example, $C_{12}$-$C_{50}$),
each of $R^{32}$ is independently, the same or different, H, an alkyl group having 1-4 carbon atoms, a benzyl group and a polyoxyethylene group (the number of oxyethylene groups is for example, 1-50 (particularly 2-50, especially 3-50) ($CH_3$ and $C_2H_5$ are particularly preferable),
X is a halogen atom (for example, chlorine and bromine), or a fatty acid salt group having 1-4 carbon atoms, and
p is 1 or 2 and q is 2 or 3 provided that p+q=4. The carbon number of $R^{31}$ may be 12 to 50, for example, 12 to 30.

Specific examples of the cationic surface active agent include dodecyl trimethyl ammonium acetate, trimethyl tetradecyl ammonium chloride, hexadecyl trimethyl ammonium bromide, trimethyl octadecyl ammonium chloride, trimethyl (dodecylmethylbenzyl) ammonium chloride, benzyl dodecyl dimethyl ammonium chloride, methyl dodecyl di(hydropolyoxyethylene) ammonium chloride, and benzyl dodecyldi(hydropolyoxyethylene) ammonium chloride salt.

The amphoteric surface active agent includes alanines, imidazolinium betaines, amidobetaines and betaine acetates. Specific examples of the amphoteric surface active agent include lauryl betaine, stearyl betaine, lauryl carboxymethyl hydroxyethyl imidazolinium betaine, lauryl dimethyl betaine aminoacetate and fatty acid amide propyl dimethylamino betaine acetate.

Each of the nonionic surface active agent, the cationic surface active agent and the amphoteric surface active agent may be used alone or in a combination of at least two.

The amount of the cationic surface active agent may be preferably at least 15% by the weight, more preferably at least 20% by weight, particularly preferably 25% of the weight, based on a total amount of the surface active agent. A weight ratio of the nonionic surface active agent to the cationic surface active agent may be preferably 85:15 to 20:80, more preferably 80:20 to 40:60.

The amount of the cationic surface active agent may be from 0.05 to 10 parts by weight, for example, from 0.1 to 8 parts by weight, based on 100 parts by weight of the polymer. The total amount of the surface active agent may be from 0.1 to 20 parts by weight, for example, from 0.2 to 10 parts by weight, based on 100 parts by weight of the polymer.

(3) Liquid Medium

The liquid medium may be water alone, or a mixture of water and an (water-soluble) organic solvent. The amount of the organic solvent may be at most 30% by weight (preferably at least 0.1%), for example, at most 10% by weight, based on the liquid medium. The liquid medium is preferably water alone.

The amount of the fluid medium may be, for example, 5 to 99.9% by weight, particularly 10 to 80% by weight, based on the surface treatment agent.

The water- and oil-repellent composition of the present invention may contain only the above-mentioned fluorine-free polymer as the polymer (active ingredient). However, a fluorine-containing polymer may be contained in addition to the above-mentioned fluorine-free polymer. Generally, in the water- and oil-repellent composition (particularly an aqueous emulsion), particles formed from the fluorine-free polymer and particles formed from the fluorine-containing polymer are separately present. That is, preferably, the fluorine-free polymer and the fluorine-containing polymer are separately prepared and then the fluorine-free polymer and the fluorine-containing polymer are mixed. That is, preferably, an emulsion (particularly an aqueous emulsion) of the fluorine-free polymer and an emulsion (particularly an aqueous emulsion) of the fluorine-containing polymer are separately prepared and then the fluorine-free polymer emulsion and the fluorine-containing polymer emulsion are mixed.

The fluorine-containing polymer is a polymer having a repeating unit derived from a fluorine-containing monomer. The fluorine-containing monomer is preferably an acrylate ester or acrylamide represented by the general formula:

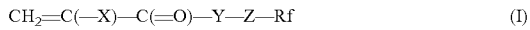

wherein X is a hydrogen atom, a linear or branched alkyl group having 1 to 21 carbon atoms, a fluorine atom, a chlorine atom, a bromine atom, an iodine atom, a CFX1X2 group (where each of X1 and X2 is a hydrogen atom, a fluorine atom, a chlorine atom, a bromine atom or an iodine atom), a cyano group, a linear or branched fluoroalkyl group having 1 to 20 carbon atoms, a substituted or unsubstituted benzyl group, or a substituted or unsubstituted phenyl group;
Y is —O— or —NH—;
Z is an aliphatic group having 1-10 carbon atoms, an aromatic group or cycloaliphatic group having 6-18 carbon atoms,
a —$CH_2CH_2N(R^1)SO_2$— group (where $R^1$ is an alkyl group having 1-4 carbon atoms),
a —$CH_2CH(OZ^1)CH_2$— group (where $Z^1$ is a hydrogen atom or an acetyl group),
a —$(CH_2)_m$—$SO_2$—$(CH_2)_n$— group or a —$(CH_2)_m$—S—$(CH_2)_n$— group (where m is 1-10 and n is 0-10), Rf is a linear or branched fluoroalkyl group having 1 to 20 carbon atoms.

The carbon number of the Rf group is preferably from 1 to 6, particularly from 4 to 6, especially 6.

The fluorine-containing polymer may have a repeating unit derived from at least one fluorine-free monomer selected from the group consisting of a halogenated olefin monomer, a fluorine-free non-crosslinkable monomer and a fluorine-free crosslinkable monomer.

Preferably, the halogenated olefin monomer is an olefin having 2-20 carbon atoms and substituted by 1-10 chlorine atoms, bromine atoms or iodine atoms. Examples of the halogenated olefin monomer are a vinyl halide such as vinyl chloride, vinyl bromide and vinyl iodide, and a vinylidene halide such as vinylidene chloride, vinylidene bromide and vinylidene iodide.

A preferable fluorine-free non-crosslinkable monomer is a compound represented by the formula:

$$CH_2=CA-T$$

wherein A is a hydrogen atom, a methyl group, or a halogen atom other than a fluorine atom (for example, a chlorine atom, a bromine atom, and an iodine atom), T is a hydrogen atom, an open-chain or cyclic hydrocarbon group having 1 to 20 carbon atoms, or an open-chain or cyclic organic group having 1 to 20 carbon atoms and an ester bond. Examples of the fluorine-free non-crosslinkable monomer include an alkyl (meth) acrylate ester, ethylene, vinyl acetate, acrylonitrile, styrene, a poly(ethylene glycol) (meth)acrylate, polypropyleneglycol (meth)acrylate, methoxypolyethyleneglycol (meth)acrylate, methoxypolypropyleneglycol (meth) acrylate and vinyl alkyl ether.

The fluorine-free crosslinkable monomer may be a compound which has at least two carbon-carbon double bonds (for example, (meth)acrylic groups) or a compound which has at least one carbon-carbon double bond and at least one reactive group.

A weight ratio of the fluorine-free polymer to the fluorine-containing polymer in the water- and oil-repellent composition may be 100:0-10:90, for example, 90:10-20:80, preferably 80:20-30:70.

Each of the fluorine-free polymer and the fluorine-containing polymer may be one type of polymer, or may be a combination of at two types of polymer.

The use of the combination of the fluorine-free polymer and the fluorine-containing polymer gives performances (particularly water- and oil-repellency) which are equivalent to or better than the use of only the fluorine-containing polymer.

The polymer(s) (a polymer free from a fluoroalkyl group, particularly a fluorine-free polymer, and a fluorine-containing polymer, particularly a copolymer containing a fluoroalkyl group) in the present invention can be produced by any of conventional polymerization methods and the polymerization condition can be optionally selected. The polymerization method includes, for example, a solution polymerization, a suspension polymerization and an emulsion polymerization. The emulsion polymerization is preferable.

If the treatment agent of the present invention is an aqueous emulsion, the method of preparing the polymer is not be limited. For example, the polymer is prepared by the solution polymerization, then the solvent is removed and the surface active agent and water are added to obtain the aqueous emulsion.

In a solution polymerization, there can be used a method of dissolving the monomer(s) into an organic solvent in the presence of a polymerization initiator, replacing the atmosphere by nitrogen, and stirring the mixture with heating at the temperature within the range from 30° C. to 120° C. for 1 hour to 10 hours. Examples of the polymerization initiator include azobisisobutyronitrile, benzoyl peroxide, di-tert-butyl peroxide, lauryl peroxide, cumene hydroperoxide, t-butyl peroxypivalate and diisopropyl peroxydicarbonate. The polymerization initiator may be used in the amount within the range from 0.01 to 20 parts by weight, for example, from 0.01 to 10 parts by weight, based on 100 parts by weight of total of the monomers.

The organic solvent is inert to the monomer, and dissolves the monomer, and examples of the organic solvent include an ester (for example, an ester having 2-30 carbon atoms, specifically ethyl acetate and butyl acetate), a ketone (for example, a ketone having 2-30 carbon atoms, specifically methyl ethyl ketone and diisobutyl ketone), and an alcohol (for example, an alcohol having 1-30 carbon atoms, specifically isopropyl alcohol). Specific examples of the organic solvent include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, diisobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 10 to 2,000 parts by weight, for example, from 50 to 1,000 parts by weight, based on 100 parts by weight of total of the monomers.

In an emulsion polymerization, there can be used a method of emulsifying monomers in water in the presence of a polymerization initiator and an emulsifying agent, replacing the atmosphere by nitrogen, and copolymerizing with stirring, for example, at the temperature within the range from 50° C. to 80° C. for 1 hour to 10 hours. As the polymerization initiator, for example, water-soluble initiators (e.g., benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate and ammonium persulfate) and oil-soluble initiators (e.g., azobisisobutyronitrile, benzoyl peroxide, di-tert-butyl peroxide, lauryl peroxide, cumene hydroperoxide, t-butyl peroxypivalate and diisopropyl peroxydicarbonate) are used. The polymerization initiator may be used in the amount within the range from 0.01 to 10 parts by weight based on 100 parts by weight of the monomers.

In order to obtain a copolymer dispersion in water, which is superior in storage stability, it is preferable that the monomers are dispersed in water by using an emulsifying device capable of applying a strong shearing energy (e.g., a high-pressure homogenizer and an ultrasonic homogenizer) and then polymerized. As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. The anionic emulsifying agent and/or the cationic emulsifying agent and/or the nonionic emulsifying agent are preferable. When the monomers are not completely compatibilized, a compatibilizing agent (e.g., a water-soluble organic solvent and a low-molecular weight monomer) capable of sufficiently compatibilizing them is preferably added to these monomers. By the addition of the compatibilizing agent, the emulsifiability and polymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in the amount within the range from 1 to 50 parts by weight, e.g., from 10 to 40 parts by weight, based on 100 parts by weight of water. Examples of the low-molecular weight monomer include methyl methacrylate, glycidyl methacrylate and 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers.

A chain transfer agent may be used in the polymerization. The molecular weight of the polymer can be changed according to the amount of the chain transfer agent used. Examples of the chain transfer agent include a mercaptan group-containing compound (particularly alkyl mercaptan (for example, carbon numbers 1-30)), such as lauryl mercaptan, thioglycol and thioglycerol, and a mineral salt such as sodium hypophosphite and sodium hydrogen sulfite. The amount of the chain transfer agent may be within the range from 0.01 to 10 parts by weight, for example, from 0.1 to 5 parts by weight, based on 100 parts by weight of total of the monomers.

Generally, a liquid comprising the first monomer is subjected to a polymerization reaction to produce the first polymer, and then, a liquid comprising the first polymer and the second monomer is subjected to a polymer reaction to produce the second polymer, whereby the copolymer comprising the first polymer and the second polymer is obtained. The polymerization of the second polymer may be initiated during the polymerization of the first polymer, or the polymerization of the second polymer may be initiated after the completion of the polymerization of the first polymer. Alternatively, the polymerization of the second polymer may be initiated, after at least 10% (namely, 10 to 100%), for example, at least 40% (namely, 40 to 100%), especially at least 70% (namely, 70 to 100%) of the polymerization reaction of the first polymer (namely, the polymerization reaction of the first monomer) is conducted. The conduct rate (%) of the polymerization reaction (namely, a polymerization reaction progress rate %) means mol % of a reacted monomer (that is, a monomer which has been polymerized). For example, when the polymerization reaction is completed at 10%, a polymerized monomer is 10 mol % and an unreacted (unpolymerized) monomer is 90 mol %. When the first monomer is a combination of at least two types of monomers, mol % of the first monomer is based on total mol of at least two types of monomers in the first monomer.

The term "during the polymerization of the first polymer" means that the polymerization reaction of the first polymer (namely, the polymerization reaction of the first monomer) is not completely conducted. For example, after the polymerization of the first polymer is conducted in a range of at least 10% to less than 40%, in a rage of at least 40% to less than 70%, or in a range of at least 70% to less than 100% (particularly 80%-99%, especially 85%-98%), the polymerization of the second polymer may be initiated.

The term "after the completion of the polymerization" means that the polymerization reaction of the first polymer (namely, the polymerization reaction of the first monomer) is conducted at about 100%.

When the polymerization of the second polymer is initiated during the polymerization of the first polymer, the second polymer has repeating units derived from the first monomer and the second monomer. When the polymerization of a second polymer is initiated after the completion of the polymerization of the first polymer, the second polymer has a repeating unit derived only from the second monomer.

The charge of the first monomer may be performed by one package (that is, collectively or at one time), or may be performed continuously. Preferably, the charge of the first monomer is performed at one time.

The charge of the second monomer may be performed by one package, or may be performed continuously. Preferably, the continuous charge of the second monomer is conducted so that the pressure of a monomer gas (especially, a halogenated olefin, such as vinyl chloride) is constant during the polymerization of the second monomer.

In the copolymer of the present invention, the first polymer is or is not chemically bonded to the second polymer.

Preferably, an unreacted long-chain acrylate ester monomer is substantially absent in a polymerization system, at the time when the polymerization of the second monomer is initiated. The term "substantially absent" means that the amount of the unreacted long-chain acrylate ester monomer is at most 10 mol %, preferably at most 8 mol %, more preferably at most 5 mol %, particularly at most 3 mol %, especially at most 1 mol %, based on the charged long-chain acrylate ester monomer, at the time when the polymerization of the second monomer is initiated. The substantial absence of the long-chain acrylate ester monomer gives the excellent performance which prevents a roll dirt by polymer adhering to a roll, in the processing treatment of the treatment agent comprising the copolymer.

Preferably, the copolymer of the present invention is manufactured by emulsification polymerization. In the particles of the aqueous dispersion formed from the first polymer and the second polymer, the second polymer may surround around the first polymer, and/or the copolymer may have the core/shell structure wherein the core of the first polymer is surrounded by the shell of the second polymer.

The treatment composition of the present invention may be in the form of a solution, an emulsion (particularly an aqueous dispersion) or an aerosol, but is preferably in the form of an aqueous dispersion. The treatment composition generally comprises the copolymer (active ingredient of the surface treatment agent) and a medium (particularly a liquid medium, for example, an organic solvent and/or water). The amount of the medium may be, for example, from 5 to 99.9% by weight, particularly 10 to 80% by weight, based on the treatment composition.

The concentration of the copolymer may be from 0.01 to 95% by weight, for example, 5 to 50% by weight, based on the treatment composition.

The treatment composition can be applied to a substrate to be treated by a known procedure. Usually, the treatment composition is diluted with an organic solvent or water, is adhered to surfaces of the substrate by a well-known procedure such as an immersion coating, a spray coating and a foam coating, and is dried. If necessary, the treatment liquid is applied together with a suitable crosslinking agent (for example, a blocked isocyanate), followed by curing. It is also possible to add mothproofing agents, softeners, antimicrobial agents, flame retardants, antistatic agents, paint fixing agents, crease-proofing agents, etc. to the treatment composition. The concentration of the copolymer in the treatment liquid contacted with the substrate may be from 0.01 to 10% by weight (particularly for immersion coating), for example, from 0.05 to 10% by weight, based on the treatment liquid.

The substrate to be treated with the treatment composition (for example, a water- and oil-repellent agent) of the present invention include a textile, masonry, a filter (for example, an electrostatic filter), a dust protective mask, a part of fuel cell (for example, a gaseous diffusion electrode and a gaseous diffusion support), glass, paper, wood, leather, fur, asbestos, brick, cement, metal and oxide, ceramics, plastics, a coated surface and a plaster. The textile includes various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semi-synthetic fibers such as rayon and acetate; inorganic fibers such as glass fiber, carbon fiber and asbestos fiber; and a mixture of these fibers.

The textile may be in any form such as a fiber and a fabric.

The treatment composition of the present invention can be used also as an internal mold release agent or an external mold release agent.

The copolymer can be applied to fibrous substrates (such as textiles) by any known method to treat textiles with liquid. When the textile is a cloth, the cloth may be immersed in the solution or the solution may be adhered or sprayed to the cloth. The treated textiles are dried, preferably heated at a temperature between 100° C. and 200° C. in order to develop the oil repellency.

Alternatively, the copolymer can be applied to a textile via a cleaning process, such as in a laundry application or dry cleaning process.

The textile which is treated is typically a fabric, including woven, knitted and nonwoven fabrics, fabrics in garment form and carpet, but may also be a fibre or yarn or intermediate textile product such as a sliver or roving. The textile material can be a natural fibre such as cotton or wool, a manmade fibre such as viscose rayon or lyocell or a synthetic fibre such as polyester, polyamide or acrylic fibre, or can be a mixture of fibres such as a mixture of natural and synthetic fibres. The polymeric product of the invention is particularly effective in rendering cellulosic fibres such as cotton or rayon oleophobic and oil repellent. The method of the invention generally also renders the textile hydrophobic and water repellent.

The fibrous substrate can alternatively be leather. The polymeric product can be applied to leather from aqueous solution or emulsion at various stages of leather processing, for example during leather wet end processing or during leather finishing, to render the leather hydrophobic and oleophobic.

The fibrous substrate can alternatively be paper. The polymeric product can be applied to preformed paper or at various stages of papermaking, for example during drying of the paper.

The term "treatment" means that the treatment agent is applied to the substrate by, for example, immersion, spray or coating. The treatment gives the result that the copolymer which is an active component of the treatment agent is penetrated into internal parts of the substrate and/or adhered to surfaces of the substrate.

Preferably, a zeta potential of the surface treatment agent is at least +30 mV. Preferably, a dynamic surface tension of the surface treatment agent is at most 55 mN/m.

EXAMPLES

The following Examples and Comparative Examples are shown to specifically illustrate the present invention. However, the present invention is not limited to these Examples.

In the following Examples, parts, % and ratio are parts by weight, % by weight and weight ratio, unless otherwise specified.

The procedures of the tests were as follows:

Tackiness of Polymer

A liquid obtained by dispersing 10 g of an aqueous dispersion liquid of polymer in 20 g of methanol was centrifuged at 10,000 rpm for 60 minutes to separate the polymer from the emulsifier, whereby obtaining a sample polymer for measurement. The tackiness of this polymer was measured by a tacking testing machine TAC-2 (manufactured by RHESCA). The tackiness was measured by using a sample polymer amount of 0.1 g, a measurement temperature of 40° C., and a load of 500 gf.

Gum-Up Property

An aqueous dispersion liquid of polymer was diluted with tap water to give a solid concentration of 1.8 wt %, and a treatment liquid was charged into a pad which could be adjusted to a temperature of 40° C. In the manner that a continuous treatment can be carried out with a mangle roll wherein a cotton fabric was made into a ring, the continuous treatment was performed with a mangle pressure of 5.5 kgf/cm$^2$. An adhesion state of the polymer to the mangle was visually observed after 1 hour, and the gum-up property is evaluated according to standards of the following Table 2.

TABLE 2

| Point | Gum-up state |
| --- | --- |
| 5 | Almost no adhesion to roll |
| 4 | Slight adhesion of fine rough-textured substances to roll, and easily removed |
| 3 | Adhesion of slightly sticky and massive substances to roll, and easily removed |
| 2 | Adhesion of sticky and massive substances to roll, and hardly removed |
| 1 | Much adhesion of sticky and massive substances to roll, and hardly removed |

Resin Adhesion to Calendar Roll

An aqueous dispersion liquid of polymer was diluted with tap water so that a solid concentration was 1.8% by weight to obtain a treatment liquid. After a polyester cloth was immersed in the treatment liquid, the cloth was passed through a mangle and heat-cured at 160° C. for 2 minutes to obtain a treated cloth. The treated cloth was made into a ring so that the treated cloth could be continuously processed on a calendar roll, the continuous processing was performed at a temperature of 160° C. and a pressure of 30 kgf/cm$^2$. An adhesion state of the polymer to the calendar roll was visually observed after 1 hour, and a resin adhesion was evaluated as in below.

| | |
| --- | --- |
| Excellent | No adhesion to roll |
| Good | Slight adhesion to roll |
| Good/Fair | Adhesion to roll, but trace is thin |
| Fair | Clear adhesion to roll |
| Bad | Clear adhesion to roll, and trace is thick |

Stability of Polymer Dispersion Liquid

Stability of the polymer dispersion liquid was evaluated as follows by visually observing a reaction scale adhering onto an autoclave after the polymerization.

| | |
| --- | --- |
| Excellent | No reaction scale adhesion |
| Good | Slight reaction scale adhesion |

-continued

| | |
|---|---|
| Fair | Small reaction scale adhesion |
| Bad | Large reaction scale adhesion |

Water Repellency Test

Water repellency of the treated cloth was evaluated according to a spray method of JIS-L-1092 (AATCC-22). The water repellency was expressed by water repellency No., as shown in the following Table 3. The larger the No. is, the better the water repellency is. An intermediate numeral values (95, 85 and 75) were allotted according to a state of the water repellency.

TABLE 3

| Water repellency No. | State |
|---|---|
| 100 | No wet or water droplets adhesion on surface |
| 90 | No wet but small water droplets adhesion on surface |
| 80 | Separate small water droplets-like wet on surface |
| 70 | Wet on half of surface and separate small wet penetrating into fabric |
| 50 | Wet on whole surface |
| 0 | Wet on front and back whole surfaces |

Preparative Example 1

Stearyl acrylate (80 g), pure water (180 g), tripropylene glycol (30 g), sorbitan monooleate (3 g), sec-$C_{12-14}H_{25-29}$($C_2H_4O)_{20}$H (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. Then, vinyl chloride (5 g) was pressure-injected. 2,2'-Azobis(2-amidinopropane) dihydrochloride (1 g) was added and a reaction was conducted at 60° C. for 1 hour (polymerization reaction: 98% polymerization conduction of stearyl acrylate). Vinyl chloride (15 g) was continuously pressure-injected so that an internal pressure of the autoclave was maintained to be 0.3 MPa, and the reaction was further conducted for 2 hours to obtain an aqueous dispersion liquid of a polymer. Furthermore, a solid concentration was adjusted with pure water to be 30%.

Preparative Example 2

Stearyl acrylate (80 g), pure water (180 g), tripropylene glycol (30 g), sorbitan monooleate (3 g), sec-$C_{12-14}H_{25-29}$($C_2H_4O)_{20}$H (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. Then, vinyl chloride (2 g) was pressure-injected. 2,2'-Azobis(2-amidinopropane) dihydrochloride (1 g) was added and a reaction was conducted at 60° C. for 1 hour (polymerization reaction: 98% polymerization conduction of stearyl acrylate). Vinyl chloride (18 g) was continuously pressure-injected so that an internal pressure of the autoclave was maintained to be 0.3 MPa, and the reaction was further conducted for 2 hours to obtain an aqueous dispersion liquid of a polymer. Furthermore, a solid concentration was adjusted with pure water to be 30%.

Preparative Example 3

Stearyl acrylate (80 g), pure water (180 g), tripropylene glycol (30 g), sorbitan monooleate (3 g), sec-$C_{12-14}H_{25-29}$($C_2H_4O)_{20}$H (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. Then, vinyl chloride (8 g) was pressure-injected. 2,2'-Azobis(2-amidinopropane) dihydrochloride (1 g) was added and a reaction was conducted at 60° C. for 1 hour (polymerization reaction: 98% polymerization conduction of stearyl acrylate). Vinyl chloride (12 g) was continuously pressure-injected so that an internal pressure of the autoclave was maintained to be 0.3 MPa, and the reaction was further conducted for 2 hours to obtain an aqueous dispersion liquid of a polymer. Furthermore, a solid concentration was adjusted with pure water to be 30%.

Preparative Example 4

Stearyl acrylate (60 g), lauryl acrylate (20 g), pure water (180 g), tripropylene glycol (30 g), sorbitan monooleate (3 g), sec-$C_{12-14}H_{25-29}$($C_2H_4O)_{20}$H (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. Then, vinyl chloride (5 g) was pressure-injected. 2,2'-Azobis(2-amidinopropane) dihydrochloride (1 g) was added and a reaction was conducted at 60° C. for 1 hour (polymerization reaction: 98% polymerization conduction of stearyl acrylate and 98% polymerization conduction of lauryl acrylate). Vinyl chloride (15 g) was continuously pressure-injected so that an internal pressure of the autoclave was maintained to be 0.3 MPa, and the reaction was further conducted for 2 hours to obtain an aqueous dispersion liquid of a polymer. Furthermore, a solid concentration was adjusted with pure water to be 30%.

Preparative Example 5

Stearyl acrylate (60 g), isobornyl methacrylate (20 g), pure water (180 g), tripropylene glycol (30 g), sorbitan monooleate (3 g), sec-$C_{12-14}H_{25-29}$($C_2H_4O)_{20}$H (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. Then, vinyl chloride (5 g) was pressure-injected. 2,2'-Azobis(2-amidinopropane) dihydrochloride (1 g) was added and a reaction was conducted at 60° C. for 1 hour (polymerization reaction: 97% polymerization conduction of stearyl acrylate and 96% polymerization conduction of isobornyl methacrylate). Vinyl chloride (15 g) was continuously pressure-injected so that an internal pressure of the autoclave was maintained to be 0.3 MPa, and the reaction was further conducted for 2 hours to obtain an aqueous dispersion liquid of a polymer. Furthermore, a solid concentration was adjusted with pure water to be 30%.

Preparative Example 6

Stearyl acrylate (70 g), 2,3-dihydroxypropyl acrylate (5 g), pure water (180 g), tripropylene glycol (30 g), sorbitan monooleate (3 g), sec-$C_{12-14}H_{25-29}(C_2H_4O)_{20}H$ (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. Then, vinyl chloride (6.25 g) was pressure-injected. 2,2'-Azobis (2-amidinopropane) dihydrochloride (1 g) was added and a reaction was conducted at 60° C. for 1 hour (polymerization reaction: 98% polymerization conduction of stearyl acrylate and 97% polymerization conduction of 2,3-dihydroxypropyl acrylate). Vinyl chloride (18.75 g) was continuously pressure-injected so that an internal pressure of the autoclave was maintained to be 0.3 MPa, and the reaction was further conducted for 2 hours to obtain an aqueous dispersion liquid of a polymer. Furthermore, a solid concentration was adjusted with pure water to be 30%.

Preparative Example 7

Stearyl acrylate (70 g), 1,4-butanediol diacrylate (5 g), pure water (180 g), tripropylene glycol (30 g), sorbitan monooleate (3 g), sec-$C_{12-14}H_{25-29}(C_2H_4O)_{20}H$ (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. Then, vinyl chloride (6.25 g) was pressure-injected. 2,2'-Azobis (2-amidinopropane) dihydrochloride (1 g) was added and a reaction was conducted at 60° C. for 1 hour (polymerization reaction: 97% polymerization conduction of stearyl acrylate and 98% polymerization conduction of 1,4-butanediol diacrylate). Vinyl chloride (18.75 g) was continuously pressure-injected so that an internal pressure of the autoclave was maintained to be 0.3 MPa, and the reaction was further conducted for 2 hours to obtain an aqueous dispersion liquid of a polymer. Furthermore, a solid concentration was adjusted with pure water to be 30%.

Preparative Example 8

Stearyl acrylate (70 g), 2,3-dihydroxypropyl acrylate (5 g), pure water (180 g), tripropylene glycol (30 g), sorbitan monooleate (3 g), sec-$C_{12-14}H_{25-29}(C_2H_4O)_{20}H$ (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. Then, vinylidene chloride (6.25 g) was pressure-injected. 2,2'-Azobis(2-amidinopropane) dihydrochloride (1 g) was added and a reaction was conducted at 60° C. for 1 hour (polymerization reaction: 97% polymerization conduction of stearyl acrylate and 98% polymerization conduction of 1,4-butanediol diacrylate). Vinylidene chloride (18.75 g) was continuously pressure-injected so that an internal pressure of the autoclave was maintained to be 0.3 MPa, and the reaction was further conducted for 2 hours to obtain an aqueous dispersion liquid of a polymer. Furthermore, a solid concentration was adjusted with pure water to be 30%.

Preparative Example 9

Stearyl acrylate (50 g), lauryl acrylate (20 g), isobornyl methacrylate (15 g), pure water (180 g), tripropylene glycol (30 g), sorbitan monooleate (3 g), sec-$C_{12-14}H_{25-29}(C_2H_4O)_{20}H$ (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. Then, vinyl chloride (3.75 g) was pressure-injected. 2,2'-Azobis (2-amidinopropane) dihydrochloride (1 g) was added and a reaction was conducted at 60° C. for 1 hour (polymerization reaction: 99% polymerization conduction of stearyl acrylate, 98% polymerization conduction of lauryl acrylate and 96% polymerization conduction of isobornyl methacrylate). Vinyl chloride (11.25 g) was continuously pressure-injected so that an internal pressure of the autoclave was maintained to be 0.3 MPa, and the reaction was further conducted for 2 hours to obtain an aqueous dispersion liquid of a polymer. Furthermore, a solid concentration was adjusted with pure water to be 30%.

Preparative Example 10

Stearyl acrylate (50 g), lauryl acrylate (20 g), isobornyl methacrylate (15 g), pure water (180 g), tripropylene glycol (30 g), sorbitan monooleate (3 g), sec-$C_{12-14}H_{25-29}(C_2H_4O)_{20}H$ (4 g) and dioctadecyl dimethyl ammonium chloride (3 g) were charged into a 500 mL autoclave, and ultrasonically emulsified under stirring, at 60° C. for 15 minutes. After an inside of the autoclave was replaced with nitrogen, vinyl chloride (3.75 g) was pressure-injected. 2,2'-Azobis(2-amidinopropane) dihydrochloride (1 g) was added and a reaction was conducted at 60° C. for 1 hour (polymerization reaction: 99% polymerization conduction of stearyl acrylate, 98% polymerization conduction of lauryl acrylate and 96% polymerization conduction of isobornyl methacrylate). Vinyl chloride (11.25 g) was continuously pressure-injected so that an internal pressure of the autoclave was maintained to be 0.3 MPa, and the reaction was further conducted for 2 hours to obtain an aqueous dispersion liquid of a polymer. Furthermore, a solid concentration was adjusted with pure water to be 30%.

Preparative Example 11

Stearyl acrylate (50 g), lauryl acrylate (15 g), isobornyl methacrylate (10 g), 2,3-dihydroxypropyl acrylate (5 g), pure water (180 g), tripropylene glycol (30 g), sorbitan monooleate (3 g), sec-$C_{12-14}H_{25-29}(C_2H_4O)_{20}H$ (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. Then, vinyl chloride (5 g) was pressure-injected. 2,2'-Azobis(2-amidinopropane) dihydrochloride (1 g) was added and a reaction was conducted at 60° C. for 1 hour (polymerization reaction: 98% polymerization conduction of stearyl acrylate, 98% polymerization conduction of lauryl acrylate, 97% polymerization conduction of isobornyl methacrylate and 97% polymerization conduction of 2,3-dihydroxypropyl acrylate). Vinyl chloride (15 g) was continuously pressure-injected so that an internal pressure of the autoclave was maintained to be 0.3 MPa, and the reaction was further conducted for 2 hours to obtain an aqueous dispersion liquid of a polymer. Furthermore, a solid concentration was adjusted with pure water to be 30%.

Preparative Example 12

Stearyl acrylate (50 g), lauryl acrylate (15 g), benzyl methacrylate (10 g), 1,4-butanediol diacrylate (5 g), pure water (180 g), tripropylene glycol (30 g), sorbitan monooleate (3 g), sec-$C_{12-14}H_{25-29}(C_2H_4O)_{20}H$ (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. Then, vinyl chloride (5 g) was pressure-injected. 2,2'-Azobis(2-amidinopropane) dihydrochloride (1 g) was added and a reaction was conducted at 60° C. for 1 hour (polymerization reaction: 98% polymerization conduction of stearyl acrylate, 98% polymerization conduction of lauryl acrylate, 97% polymerization conduction of benzyl methacrylate and 98% polymerization conduction of 1,4-butanediol diacrylate). Vinyl chloride (15 g) was continuously pressure-injected so that an internal pressure of the autoclave was maintained to be 0.3 MPa, and the reaction was further conducted for 2 hours to obtain an aqueous dispersion liquid of a polymer. Furthermore, a solid concentration was adjusted with pure water to be 30%.

Preparative Example 13

Stearyl acrylate (50 g), lauryl acrylate (15 g), cyclohexyl methacrylate (10 g), 1,4-butanediol diacrylate (5 g), pure water (180 g), tripropylene glycol (30 g), sorbitan monooleate (3 g), sec-$C_{12-14}H_{25-29}(C_2H_4O)_{20}H$ (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. Then, vinyl chloride (5 g) was pressure-injected. 2,2'-Azobis(2-amidinopropane) dihydrochloride (1 g) was added and a reaction was conducted at 60° C. for 1 hour (polymerization reaction: 97% polymerization conduction of stearyl acrylate, 98% polymerization conduction of lauryl acrylate, 98% polymerization conduction of cyclohexyl methacrylate and 98% polymerization conduction of 1,4-butanediol diacrylate). Vinyl chloride (15 g) was continuously pressure-injected so that an internal pressure of the autoclave was maintained to be 0.3 MPa, and the reaction was further conducted for 2 hours to obtain an aqueous dispersion liquid of a polymer. Furthermore, a solid concentration was adjusted with pure water to be 30%.

Preparative Example 14

Behenyl acrylate (50 g), lauryl acrylate (15 g), cyclohexyl methacrylate (10 g), 1,4-butanediol diacrylate (5 g), pure water (180 g), tripropylene glycol (30 g), sorbitan monooleate (3 g), sec-$C_{12-14}H_{25-29}(C_2H_4O)_{20}H$ (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. Then, vinyl chloride (5 g) was pressure-injected. 2,2'-Azobis(2-amidinopropane) dihydrochloride (1 g) was added and a reaction was conducted at 60° C. for 1 hour (polymerization reaction: 97% polymerization conduction of behenyl acrylate, 98% polymerization conduction of lauryl acrylate, 97% polymerization conduction of cyclohexyl methacrylate and 97% polymerization conduction of 1,4-butanediol diacrylate). Vinyl chloride (15 g) was continuously pressure-injected so that an internal pressure of the autoclave was maintained to be 0.3 MPa, and the reaction was further conducted for 2 hours to obtain an aqueous dispersion liquid of a polymer. Furthermore, a solid concentration was adjusted with pure water to be 30%.

Comparative Preparative Example 1

Stearyl acrylate (80 g), pure water (180 g), tripropylene glycol (30 g), sorbitan monooleate (3 g), sec-$C_{12-14}H_{25-29}(C_2H_4O)_{20}H$ (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. Vinyl chloride (20 g) was pressure-injected, 2,2'-azobis(2-amidinopropane) dihydrochloride (1 g) was added and a reaction was conducted at 60° C. for 3 hours to obtain an aqueous dispersion liquid of a polymer. Furthermore, a solid concentration was adjusted with pure water to be 30%.

Comparative Preparative Example 2

Stearyl acrylate (50 g), lauryl acrylate (15 g), benzyl methacrylate (10 g), 1,4-butanediol diacrylate (5 g), pure water (180 g), tripropylene glycol (30 g), sorbitan monooleate (3 g), sec-$C_{12-14}H_{25-29}(C_2H_4O)_{20}H$ (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. Vinyl chloride (20 g) was pressure-injected, 2,2'-azobis(2-amidinopropane) dihydrochloride (1 g) was added and a reaction was conducted at 60° C. for 3 hours to obtain an aqueous dispersion liquid of a polymer. Furthermore, a solid concentration was adjusted with pure water to be 30%.

Comparative Preparative Example 3

Stearyl acrylate (80 g), pure water (180 g), tripropylene glycol (30 g), sorbitan monooleate (3 g), sec-$C_{12-14}H_{25-29}(C_2H_4O)_{20}H$ (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. 2,2'-Azobis(2-amidinopropane) dihydrochloride (1 g) was added and a reaction was conducted at 60° C. for 1 hour (polymerization reaction: 98% polymerization conduction of stearyl acrylate). Vinyl chloride (20 g) was pressure-injected, and the reaction was further conducted for 2 hours to obtain an aqueous dispersion liquid of a polymer. Furthermore, a solid concentration was adjusted with pure water to be 30%.

Comparative Preparative Example 4

Stearyl acrylate (60 g), lauryl acrylate (20 g), pure water (180 g), tripropylene glycol (30 g), sorbitan monooleate (3 g), sec-$C_{12-14}H_{25-29}(C_2H_4O)_{20}H$ (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. 2,2'-Azobis(2-amidinopropane) dihydrochloride (1 g) was added and a reaction was conducted at 60° C. for 1 hour (polymerization reaction: 98% polymerization conduction of stearyl acrylate and 98% polymerization conduction of lauryl acrylate). Vinyl chloride (20 g) was pressure-injected, and the reaction was further conducted for 2 hours to obtain an aqueous dispersion liquid of a polymer. Furthermore, a solid concentration was adjusted with pure water to be 30%.

Comparative Preparative Example 5

$C_6F_{13}CH_2CH_2OCOC(CH_3)CH_2$ (C6 methacrylate) (60 g), stearyl acrylate (20 g), pure water (180 g), tripropylene glycol (30 g), sorbitan monooleate (3 g), sec-$C_{12-14}H_{25-29}$($C_2H_4O)_{20}H$ (4 g) and dioctadecyl dimethyl ammonium chloride (3 g) were charged into a 500 mL autoclave, and ultrasonically emulsified under stirring, at 60° C. for 15 minutes. After the emulsification, lauryl mercaptan (0.5 g) was added and an inside of the autoclave was replaced with nitrogen. Vinyl chloride (20 g) was pressure-injected, 2,2'-azobis(2-amidinopropane) dihydrochloride (1 g) was added and a reaction was conducted at 60° C. for 3 hours to obtain an aqueous dispersion liquid of a polymer. Furthermore, a solid concentration was adjusted with pure water to be 30%.

Example 1

Physical properties of the polymerization dispersion liquid manufactured in Preparative Example 1 were measured. In addition, the polymerization dispersion liquid was diluted with tap water so that a solid concentration was 1% by weight to obtain a test solution. After dipping a polyester cloth and a nylon cloth in this test solution, each of the cloths was passed through a mangle and heat-treated at 160° C. for 2 minutes to obtain a test cloth. Water repellency was evaluated by using the test cloth. Wash durability was evaluated by, according to the JIS-L-0217-103 method, washing the cloth 10 times with a 40° C. wash liquid, tumbler-drying the cloth and measuring water repellency (HL10).

Examples 2 to 14

The measurement of the physical properties of the polymerization dispersion liquid and the water-repellency evaluation for each of Preparative Examples 2 to 14 were performed in the same manner as in Example 1.

Example 15

In the same manner as in Example 1, water-repellency was evaluated for a dispersion liquid prepared by blending the polymerization dispersion liquid (90 parts) manufactured in Preparative Example 1 with the polymerization dispersion liquid (10 parts) manufactured in Comparative Preparative Example 5.

Example 16

In the same manner as in Example 1, water-repellency was evaluated for a dispersion liquid prepared by blending the polymerization dispersion liquid (50 parts) manufactured in Preparative Example 1 with the polymerization dispersion liquid (50 parts) manufactured in Comparative Preparative Example 5.

Comparative Examples 1 to 5

The measurement of the physical properties of the polymerization dispersion liquid and the water-repellency evaluation for each of Comparative Preparative Examples 1-5 were performed in the same manner as in Example 1.

Physical properties and water repellency in each Example are shown in Tables 4 and 5.

TABLE 4

| | | Ex. 1 Pre. Ex. 1 | Ex. 2 Pre. Ex. 2 | Ex. 3 Pre. Ex. 3 | Ex. 4 Pre. Ex. 4 | Ex. 5 Pre. Ex. 5 | Ex. 6 Pre. Ex. 6 | Ex. 7 Pre. Ex. 7 |
|---|---|---|---|---|---|---|---|---|
| First polymer | Stearyl acrylate | 80 | 80 | 80 | 60 | 60 | 70 | 70 |
| | Behenyl acrylate | | | | | | | |
| | Lauryl acrylate | | | | 20 | | | |
| | Isoboronyl methacrylate | | | | | 20 | | |
| | Benzyl methacrylate | | | | | | | |
| | Cyclohexyl methacrylate | | | | | | | |
| | 2,3-Dihydroxypropyl methacrylate | | | | | | 5 | 5 |
| | 1,4-Butanediol diacrylate | | | | | | | |
| | Vinyl chloride | 5 | 2 | 8 | 5 | 5 | 6.25 | 6.25 |
| | Vinylidene chloride | | | | | | | |
| | C6 methacrylate | | | | | | | |
| Second polymer | Vinyl chloride | 15 | 18 | 12 | 15 | 15 | 18.75 | 18.75 |
| | Vinylidene chloride | | | | | | | |
| | Charge ratio | 25/75 | 10/90 | 40/60 | 25/75 | 25/75 | 25/75 | 25/75 |
| Chain transfer agent | Lauryl mercaptan | 0.5 | 0.5 | 0.5 | 0.5 | 0.5 | 0.5 | 0.5 |
| Physical properties | Polymer tackiness | 170 | 108 | 189 | 173 | 98 | 110 | 102 |
| | Gum-up property | 4 | 5 | 4 | 4 | 5 | 4 | 4 |
| | Resin adhesion to calendar | Good/Fair | Good/Fair | Good/Fair | Good/Fair | Good | Good | Excellent |
| | Stability of polymer dispersion | Excellent | Good | Excellent | Excellent | Excellent | Excellent | Excellent |
| Water repellency | Polyester Initial | 95 | 95 | 90 | 95 | 95 | 95 | 90 |
| | HL90 | 80 | 80 | 75 | 70 | 85 | 80 | 80 |
| | Nylon Initial | 95 | 95 | 95 | 95 | 100 | 95 | 100 |
| | HL90 | 75 | 80 | 75 | 80 | 90 | 85 | 80 |

TABLE 4-continued

|  |  | Ex. 8 Pre. Ex. 8 | Ex. 9 Pre. Ex. 9 | Ex. 10 Pre. Ex. 10 | Ex. 11 Pre. Ex. 11 | Ex. 12 Pre. Ex. 12 | Ex. 13 Pre. Ex. 13 | Ex. 14 Pre. Ex. 14 |
|---|---|---|---|---|---|---|---|---|
| First polymer | Stearyl acrylate | 70 | 50 | 50 | 50 | 50 | 50 |  |
|  | Behenyl acrylate |  |  |  |  |  |  | 50 |
|  | Lauryl acrylate |  | 20 | 20 | 15 | 15 | 15 | 15 |
|  | Isoboronyl methacrylate |  | 15 | 15 | 10 |  |  |  |
|  | Benzyl methacrylate |  |  |  |  | 10 | 10 | 10 |
|  | Cyclohexyl methacrylate |  |  |  |  |  |  |  |
|  | 2,3-Dihydroxypropyl methacrylate | 5 |  |  | 5 | 5 | 5 | 5 |
|  | 1,4-Butanediol diacrylate |  |  |  |  |  |  |  |
|  | Vinyl chloride |  | 3.75 | 3.75 | 5 | 5 | 5 | 5 |
|  | Vinylidene chloride | 6.25 |  |  |  |  |  |  |
|  | C6 methacrylate |  |  |  |  |  |  |  |
| Second polymer | Vinyl chloride |  | 11.25 | 11.25 | 15 | 15 | 15 | 15 |
|  | Vinylidene chloride | 18.75 |  |  |  |  |  |  |
|  | Charge ratio | 25/75 | 25/75 | 25/75 | 25/75 | 25/75 | 25/75 | 25/75 |
| Chain transfer agent | Lauryl mercaptan | 0.5 | 0.5 | 0 | 0.5 | 0.5 | 0.5 | 0.5 |
| Physical properties | Polymer tackiness | 159 | 124 | 93 | 98 | 88 | 102 | 94 |
|  | Gum-up property | 4 | 5 | 5 | 5 | 5 | 5 | 5 |
|  | Resin adhesion to calendar | Good | Good | Excellent | Excellent | Excellent | Excellent | Excellent |
|  | Stability of polymer dispersion | Excellent | Excellent | Excellent | Excellent | Excellent | Excellent | Excellent |
| Water repellency | Polyester Initial | 90 | 100 | 95 | 95 | 100 | 95 | 100 |
|  | HL90 | 80 | 75 | 70 | 90 | 85 | 90 | 90 |
|  | Nylon Initial | 95 | 100 | 90 | 100 | 95 | 95 | 100 |
|  | HL90 | 85 | 85 | 80 | 90 | 80 | 90 | 90 |

TABLE 5

|  |  | Ex. 15 | | Ex. 16 | | Com. Ex. 1 Com. Pre. Ex. 1 | Com. Ex. 2 Com. Pre. Ex. 2 | Com. Ex. 3 Com. Pre. Ex. 3 | Com. Ex. 4 Com. Pre. Ex. 4 | Com. Ex. 5 Com. Pre. Ex. 5 |
|---|---|---|---|---|---|---|---|---|---|---|
|  |  | Pre. Ex. 1 (90 parts) | Com. Pre. Ex. 5 (10 parts) | Pre. Ex. 1 (50 parts) | Com. Pre. Ex. 5 (50 parts) |  |  |  |  |  |
| First polymer | Stearyl acrylate | 80 | 20 | 80 | 20 | 80 | 50 | 80 | 60 | 20 |
|  | Behenyl acrylate |  |  |  |  |  |  |  |  |  |
|  | Lauryl acrylate |  |  |  |  |  | 15 |  | 20 |  |
|  | Isboronyl methacrylate |  |  |  |  |  |  |  |  |  |
|  | Benzyl methacrylate |  |  |  |  |  | 10 |  |  |  |
|  | Cyclohexyl methacrylate |  |  |  |  |  |  |  |  |  |
|  | 2,3-Dihydroxypropyl methacrylate |  |  |  |  |  | 5 |  |  |  |
|  | 1,4-Butanediol diacrylate |  |  |  |  |  |  |  |  |  |
|  | Vinyl chloride | 5 | 20 | 5 | 20 | 20 | 20 | 0 | 0 | 20 |
|  | Vinylidene chloride |  | (collectively) |  | (collectively) | (collectively) | (collectively) |  |  | (collectively) |
|  | C6 methacrylate |  | 60 |  | 60 |  |  |  |  | 60 |
| Second polymer | Vinyl chloride | 15 |  | 15 |  |  |  | 20 | 20 |  |
|  | Vinylidene chloride |  |  |  |  |  |  |  |  |  |
|  | Charge ratio | 25/75 |  | 25/75 |  |  |  | 0/100 | 0/100 |  |
| Chain transfer agent | Lauryl mercaptan | 0.5 | 0.5 | 0.5 | 0.5 | 0.5 | 0.5 | 0.5 | 0.5 | 0.5 |
| Physical properties | Polymer tackiness | 170 | 163 | 170 | 163 | 425 | 383 | 157 | 169 | 163 |
|  | Gum-up property | 4 |  | 4 |  | 2 | 2 | 4 | 4 | 3 |
|  | Resin adhesion to calendar roll | Good |  | Good |  | Bad | Bad | Good/Fair | Good/Fair | Good |
|  | Stability of polymer dispersion | Excellent | Excellent | Excellent | Excellent | Excellent | Excellent | Bad | Bad | Excellent |
| Water repellency | Polyester Initial | 100 |  | 100 |  | 95 | 100 | 95 | 95 | 100 |
|  | HL10 | 80 |  | 95 |  | 75 | 90 | 75 | 70 | 95 |
|  | Nylon Initial | 95 |  | 100 |  | 90 | 100 | 90 | 90 | 100 |
|  | HL10 | 80 |  | 95 |  | 70 | 80 | 75 | 80 | 95 |

INDUSTRIAL AVAILABILITY

The treatment agent of the present invention can be used as a water- and oil-repellent agent or a soil resistant agent. The treatment agent of the present invention can be appropriately used for substrates such as textiles and masonry, and gives excellent water- and oil-repellency to the substrates.

The invention claimed is:

1. A copolymer comprising:
a first polymer formed from a first monomer mixture and a second polymer formed from a second monomer,
wherein the copolymer is free from a fluorine atom,
the second polymer is obtained by polymerizing the second monomer in the presence of the first polymer,
the first monomer mixture comprises:
(a) a long-chain acrylate ester monomer represented by the formula:

$$CH_2=CA^{11}\text{-}C(=O)\text{—}O\text{-}A^{12}$$

wherein $A^{11}$ is a hydrogen atom, a monovalent organic group, a chlorine atom, a bromine atom or an iodine atom, and
$A^{12}$ is a linear or branched hydrocarbon group having 18-30 carbon atoms,
both of the first monomer mixture and the second monomer comprise (b) a halogenated olefin monomer, and
the second monomer does not comprise the long-chain acrylate ester monomer.

2. The copolymer according to claim 1, wherein the copolymer further comprises at least one repeating unit selected from the group consisting of:
(c) a repeating unit derived from a short-chain acrylate ester monomer represented by the formula:

$$CH_2=CA^{21}\text{-}C(=O)\text{—}O\text{-}A^{22}$$

wherein $A^{21}$ is a hydrogen atom, a monovalent organic group, or a halogen atom,
$A^{22}$ is a linear or branched hydrocarbon group having less than 18 carbon atoms, and
(d) a repeating unit derived from a cyclic hydrocarbon group-containing acrylate ester monomer, and
the amount of the repeating unit (c) is 1 to 100 parts by weight, and the amount of the repeating unit (d) is 1 to 100 parts by weight, based on 100 parts by weight of monomer (a).

3. The copolymer according to claim 1, wherein the copolymer further comprises:
(e) a repeating unit derived from a fluorine-free crosslinkable monomer, and
the amount of the repeating unit (e) is 1 to 50 parts by weight, based on 100 parts by weight of monomer (a).

4. The copolymer according claim 1, wherein, in the long-chain acrylate ester monomer (a), $A^{11}$ is a methyl group or a chlorine atom, and $A^{12}$ is a linear or branched aliphatic hydrocarbon group having 18-30 carbon atoms.

5. The copolymer according to claim 1, wherein the halogenated olefin monomer (b) is at least one selected from the group consisting of vinyl chloride and vinylidene chloride.

6. The copolymer according to claim 1, wherein the first monomer mixture comprises at least one selected from the short-chain acrylate ester monomer (c), the cyclic hydrocarbon group-containing acrylate ester monomer (d) and the fluorine-free crosslinkable monomer (e), in addition to the long-chain acrylate ester monomer (a) and the halogenated olefin monomer (b).

7. The copolymer according to claim 1, wherein the second monomer consists of the halogenated olefin monomer (b).

8. The copolymer according to claim 1, wherein the amount of the monomer (a) is at least 40% by weight, based on the copolymer, and
the amount of the repeating unit (b) is 1 to 150 parts by weight, based on 100 parts by weight of monomers (a).

9. A method of producing the copolymer according to claim 1, which comprises the steps of:
(I) polymerizing the first monomer mixture to obtain the first polymer, and
(II) polymerizing the second monomer in the presence of the first polymer to obtain the second polymer,
wherein the copolymer comprises the first polymer formed from the first monomer mixture and the second polymer formed from the second monomer,
wherein the first monomer mixture comprises:
(a) a long-chain acrylate ester monomer represented by the formula:

$$CH_2=CA^{11}\text{-}C(=O)\text{—}O\text{-}A^{12}$$

wherein $A^{11}$ is a hydrogen atom, a monovalent organic group, a chlorine atom, a bromine atom or an iodine atom, and
$A^{12}$ is a linear or branched hydrocarbon group having 18-30 carbon atoms,
the first monomer mixture and the second monomer comprise (b) a halogenated olefin monomer, and
the second monomer does not comprise the long-chain acrylate ester monomer.

10. A surface treatment agent which comprises an aqueous emulsion comprising:
(1) the copolymer according to claim 1,
(2) a surface active agent, and
(3) a liquid medium comprising water.

11. The surface treatment agent according to claim 10, wherein the amount of the surface active agent (2) is 0.1 to 20 parts by weight, based on 100 parts by weight of the copolymer (1), and
the amount of the liquid medium (3) is 5 to 99.9% by weight, based on the surface treatment agent.

12. The surface treatment agent according to claim 10, which is a water- and oil-repellent agent or a soil resistant agent.

13. A method of producing the surface treatment agent according to claim 10, which comprises the steps of:
(I) polymerizing the first monomer mixture to obtain the first polymer, and
(II) polymerizing the second monomer in the presence of the first polymer to obtain a second polymer.

14. The method according to claim 13, wherein a chain transfer agent is used in the polymerization.

15. A method of treating a textile, comprising treating the textile with the surface treatment agent according to claim 10.

16. A method of producing a treated textile, which applies, to a textile, the surface treatment agent according to claim 10.

17. The copolymer according to claim 1, wherein the halogenated olefin monomer (b) is an olefin having 2-20 carbon atoms and substituted by 1-10 chlorine atoms, bromine atoms or iodine atoms.

18. The copolymer according to claim 1, wherein the polymerization of the second monomer is initiated, after 70 to 100% of the polymerization reaction of the first monomer is conducted.

19. The method according to claim 9, wherein the polymerization of the second monomer is initiated, after 70 to 100% of the polymerization reaction of the first monomer is conducted.

\* \* \* \* \*